US009704308B2

(12) United States Patent
Li et al.

(10) Patent No.: US 9,704,308 B2
(45) Date of Patent: Jul. 11, 2017

(54) INSTANT DETECTION SYSTEM OF VEHICLE

(71) Applicants: Chiu Chau Enterprise Co., Ltd, Taoyuan (TW); Signal Technology Instrument Inc., Taoyuan County (TW)

(72) Inventors: Tien-Hua Li, Yilan County (TW); Chih-Wei Hsu, Taoyuan (TW); Chih-Hui Su, Taoyuan (TW); Chih-Jung Chen, Tainan (TW); Yu-Chieh Chuang, Taoyuan (TW)

(73) Assignees: Chiu Chau Enterprise Co., Ltd, Taoyuan (TW); Signal Technology Instrument Inc., Taoyuan (TW)

( * ) Notice: Subject to any disclaimer, the term of this patent is extended or adjusted under 35 U.S.C. 154(b) by 121 days.

(21) Appl. No.: 14/951,516

(22) Filed: Nov. 25, 2015

(65) Prior Publication Data
US 2017/0061712 A1    Mar. 2, 2017

(30) Foreign Application Priority Data
Aug. 27, 2015  (TW) ............................. 104128173 A

(51) Int. Cl.
*G06F 7/00* (2006.01)
*G06F 11/30* (2006.01)
(Continued)

(52) U.S. Cl.
CPC ........... *G07C 5/0816* (2013.01); *B60W 50/00* (2013.01); *G07C 5/008* (2013.01); *G07C 5/085* (2013.01); *G07C 5/0825* (2013.01)

(58) Field of Classification Search
CPC ..... B60W 50/00; G07C 5/008; G07C 5/0816; G07C 5/0825; G07C 5/085
(Continued)

(56) References Cited

U.S. PATENT DOCUMENTS 4,296,409 A * 10/1981 Whitaker ............. A01D 41/127
340/459
5,825,286 A * 10/1998 Coulthard ............. B60C 23/009
340/442
(Continued)

FOREIGN PATENT DOCUMENTS

TW    200500238    1/2005
TW    M322492    11/2007

OTHER PUBLICATIONS

"Office Action of Taiwan Counterpart Application", issued on Jul. 21, 2016, p. 1-p. 4.

*Primary Examiner* — Harry Oh
(74) *Attorney, Agent, or Firm* — Jianq Chyun IP Office

(57) ABSTRACT

An instant detection system of a vehicle is provided. The vehicle has wheel assemblies and a brake system, and the wheel assemblies are coupled with the brake system. The instant detection system includes temperature detectors, rotational speed detectors, acoustic detectors, an analysis host and an alarm device. The temperature detectors are disposed on the brake system, and the acoustic detectors and the rotational detectors are disposed adjacent to the wheel assemblies for respectively detecting temperature information and sound information of the wheel assemblies and the brake system, and speed information of the vehicle. The analysis host is coupled with the above-mentioned detectors to receive and analyze the temperature, the sound and the speed information, so as to generate alarm information. The alarm device generates breakdown information according to the alarm information.

16 Claims, 2 Drawing Sheets

(51) Int. Cl.
    *G06F 19/00*     (2011.01)
    *G07C 7/00*     (2006.01)
    *G07C 5/08*     (2006.01)
    *G07C 5/00*     (2006.01)
    *B60W 50/00*     (2006.01)

(58) Field of Classification Search
    USPC .................................................. 701/29.1
    See application file for complete search history.

(56) References Cited

U.S. PATENT DOCUMENTS

| | | | |
|---|---|---|---|
| 6,404,329 B1* | 6/2002 | Hsu | G07C 5/006 340/438 |
| 2014/0002256 A1* | 1/2014 | Hoshiba | B60K 6/445 340/441 |
| 2015/0344038 A1* | 12/2015 | Stenneth | B60W 40/103 340/439 |
| 2016/0305974 A1* | 10/2016 | Webster | G01D 3/08 |
| 2016/0379423 A1* | 12/2016 | Nagata | B60R 16/0234 701/31.5 |

\* cited by examiner

INSTANT DETECTION SYSTEM OF VEHICLE

CROSS-REFERENCE TO RELATED APPLICATION

This application claims the priority benefit of Taiwan application serial no. 104128173, filed on Aug. 27, 2015. The entirety of the above-mentioned patent application is hereby incorporated by reference herein and made a part of this specification.

BACKGROUND

Field of the Invention

The invention is directed to an instant detection system of a vehicle and more particularly, to an instant detection system for detecting wheel assemblies and a brake system of the vehicle.

Description of Related Art

Currently, a wheel state and a brake system of a vehicle rely on periodic maintenance and checks for monitoring or are determined using sensors existing on the vehicle. Namely, the wheel state or the brake system of the vehicle at present is directly detected by field staffs. However, the detection by the field staffs visually or by means of listening usually leads to an issue of consistency in detection and determination standards. Specially, as for the state monitoring of the brake system, the detection is commonly performed visually by checking the thickness of each brake lining pad or the flatness of each disc (brake drum) during the periodic maintenance of the vehicle, and a state of the brake system is indicated by using a brake lining pad thickness sensor and a hydraulic oil level sensor.

However, the brake system and the wheels tend to be transformed due to affection by ambient temperatures. Currently, there is no predicting and detection system available for monitoring issues, such as deformation of the discs (drums), abnormally overheat (e.g., the hydraulic oil is boiled) and abnormally worn discs. As a result, vehicles often encounter unpredictable accident events. Therefore, how to instantly detect and predict breakdown situations that may occur to the brake system or the wheels and cause danger in advance while the vehicle is travelling has become an important subject.

SUMMARY

The invention provides an instant detection system of a vehicle, configured to instantly monitor whether wheel assemblies and a brake system of a vehicle is in an operational state and send out breakdown information when system abnormality occurs to the wheel assemblies and the brake.

In an instant detection system of a vehicle provided by the invention, the vehicle includes a body, wheel assemblies and a brake system, the wheel assemblies and the brake system are disposed on the body respectively. Each of the wheel assemblies includes a wheel, a rim and an axle, and the wheel assemblies are coupled with the brake system. The instant detection system includes temperature detectors, rotational speed detectors, acoustic detectors, an analysis host and an alarm device. The temperature detectors are disposed on the brake system and configured to detect temperature information of the brake system. The rotational speed detectors are disposed on the body and adjacent to the wheel assemblies to detect speed information of the wheel assemblies. The acoustic detectors are disposed on the body and adjacent to the brake system to detect sound information of the wheel assemblies or the brake system. The analysis host is disposed on the body and coupled with the temperature detectors, the rotational speed detectors and the acoustic detectors to receive the temperature information, the speed information and the sound information. The analysis host instantly analyzes the temperature information, the speed information and the sound information to generate alarm information. The alarm device is coupled to the analysis host to receive the alarm information, and the alarm device displays the breakdown information of the vehicle according to the alarm information.

In an embodiment of the invention, the brake system further includes brake calipers and brake discs. The brake calipers are coupled to the axle, and the brake calipers are movably clipped on the brake discs respectively.

In an embodiment of the invention, the vehicle further includes a suspension system. The suspension system is disposed on the body and coupled to the axle. The suspension system includes a spring, damper and linking rods. The spring sleeves the damper, and the linking rods are connected to the axle.

In an embodiment of the invention, the instant detection system further includes at least one acceleration detector. The at least one acceleration detector is disposed on at least one of the linking rods to detect vibration information of the brake system, the wheel assemblies and the suspension system.

In an embodiment of the invention, the analysis host is coupled with the at least one acceleration detector to receive the vibration information. The analysis host further analyzes according to at least one of the vibration information, the temperature information, the speed information and the sound information to generate the alarm information.

In an embodiment of the invention, the analysis host generates a vibration feature and an acoustic feature according to the speed information, the sound information and the vibration information, and the analysis host analyzes the vibration feature and the acoustic feature to generate the alarm information.

In an embodiment of the invention, the vehicle has universal joints and a clutch, and the clutch is coupled to the universal joints sequentially.

In an embodiment of the invention, the analysis host determines whether abnormality occurs to the clutch and/or the universal joints according to the vibration feature and the acoustic feature and generates the alarm information to instruct the alarm device to generate the breakdown information when the abnormality occurs to the clutch and/or the universal joints.

In an embodiment of the invention, a plurality of normal vibration features and a plurality of normal acoustic features are built in the analysis host, and the analysis host compares the vibration feature with the normal vibration features and compares the acoustic feature with the normal acoustic features, so as to determine operation states of the wheel assemblies and the brake system.

In an embodiment of the invention, the analysis host includes a digital signal processor (DSP) to compute the temperature information, the speed information, the vibration information and the sound information to generate the alarm information.

In an embodiment of the invention, the instant detection system further includes a cloud server. The cloud server is configured to receive the alarm information from the analysis host and transmit the alarm information to the alarm device deployed in a remote end through a network.

In an embodiment of the invention, the alarm device includes a display panel configured to display the breakdown information of the vehicle.

In an embodiment of the invention, the sound information comprises a frequency and amplitude of abnormal noise generated by the vehicle.

In an embodiment of the invention, the breakdown information is generated in a manner of a breakdown light or a breakdown alarm sound.

In an embodiment of the invention, the alarm device comprises an alarm light and/or a buzzer.

In an embodiment of the invention, the brake system comprises a disc brake system and a drum brake system.

To sum up, the instant detection system can instantly detect the wheel assemblies and the brake system. The instant detection system has the analysis host, and the analysis host can receive at least the temperature information from the temperature detectors, the speed information from the rotational speed detector and the sound information from the acoustic detector to generate the corresponding alarm information. Moreover, the instant detection system further has the alarm device, and the alarm device can receive the alarm information from the analysis host to generate and display the breakdown information corresponding to the wheel assemblies and the brake system. Thereby, a user or driver of the vehicle can immediately stop the operation of the vehicle according to the breakdown information of the wheel assemblies or the brake system displayed by the alarm device and repair the vehicle, so as to reduce the possibility of accidents and enhance the safety of using and driving the vehicle.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
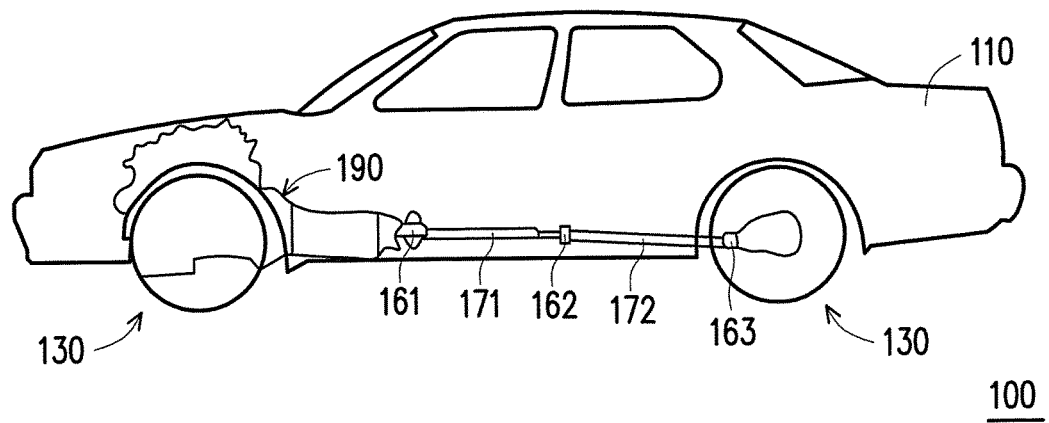
FIG. 1A and FIG. 1B are schematic diagrams illustrating an instant detection system of a vehicle according to an embodiment of the invention.
Figure 1B:
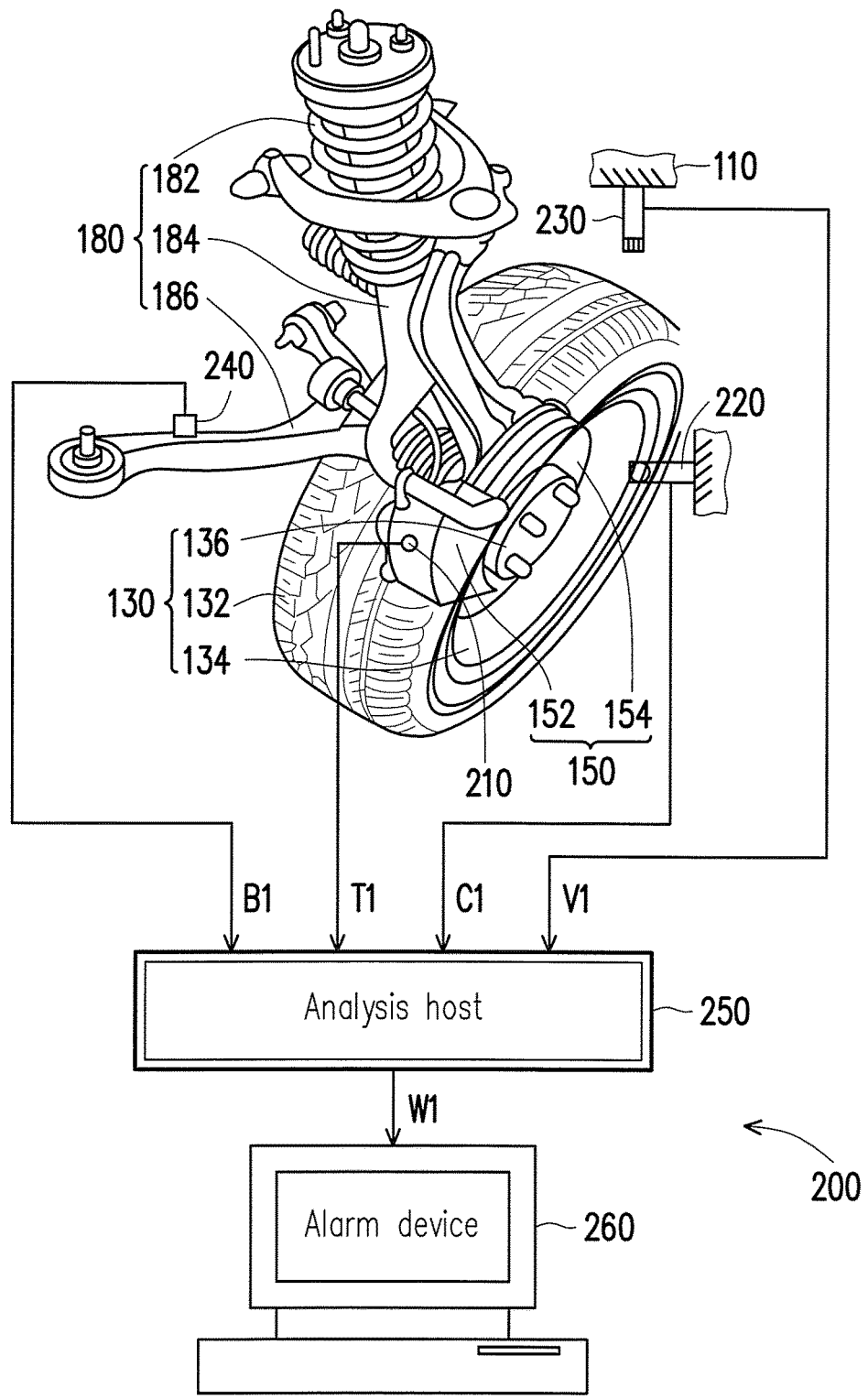

Referring to FIG. 1A and FIG. 1B, FIG. 1A and FIG. 1B are schematic diagrams illustrating an instant detection system of a vehicle according to an embodiment of the invention. Referring to FIG. 1A, in the present embodiment, a vehicle 100 includes a body 110, wheel assemblies 130 and a brake system 150. The wheel assemblies 130 and the brake system 150 are disposed on the body 110 respectively. Each of the wheel assemblies 130 includes a wheel 132, a rim 134 and an axle 136, and the wheel assemblies 130 are coupled to the brake system 150. Additionally, in the present embodiment, the vehicle 100 may further include drive shafts 171, 172, universal joints 161, 162, 163 and a clutch 190. In the present embodiment, the clutch 190, the universal joint 161, the drive shaft 171, the universal joint 162, the drive shaft 172 and the universal joint 163 may be sequentially coupled to form a gear of the vehicle 100.

Referring to FIG. 1B, the instant detection system 200 includes a temperature detector 210, a rotational speed detector 220, an acoustic detector 230, an analysis host 250 and an alarm device 260. In the present embodiment, the brake system 150 may include a brake caliper 152 and a brake disc 154, and the temperature detector 210 maybe disposed on the brake caliper 152 to detect temperature information T1 of the brake caliper 152 and the brake disc 154. The caliper 152 is movably clipped on the brake disc 154. In addition, the rotational speed detector 220 may be disposed on the body 110 and adjacent to the wheel assembly 130 to detect speed information C1 of the wheel assembly 130.

The acoustic detector 230 may be disposed on the body 110 and adjacent to the brake system 150 to detect sound information V1 of the brake system 150. In the present embodiment, the sound information V1 includes a frequency and an amplitude of abnormal noise generated during the operation process of the vehicle 100. For example, the abnormal noise generated by the vehicle 100 may be rolling noise generated by the wheel 132 when being abnormally worn, axle noise generated when the axle 136 being abraded or abnormal noise generated when abnormal friction occurs between the brake disc 154 and the brake caliper 152.

The temperature detector 210, the rotational speed detector 220, the acoustic detector 230 may be respectively coupled to the analysis host 250. In the present embodiment, the analysis host 250 may receive the temperature information T1, the speed information C1 and the sound information V1, analyzes and computes all of or part of the temperature information T1, the speed information C1 and the sound information V1, so as to generate alarm information W1.

In the present embodiment, the vehicle 100 may further include a suspension system 180. The suspension system 180 is disposed on the body 110 and coupled to the axle 136. Additionally, the suspension system 180 includes a spring 182, a damper 184 and linking rod 186, the spring 182 sleeves the damper 184, and the linking rod 186 are connected to the axle 136.

The instant detection system 200 may further include an acceleration detector 240, and the acceleration detector 240 may be disposed on the linking rod 186 of the suspension system 180 to detect vibration information B1 of the wheel assembly 130, the brake system 150 and the suspension system 180. The acceleration detector 240 may transmit the vibration information B1 to the analysis host 250. To be detailed, the analysis host 250 may generate a vibration feature and an acoustic feature according to the speed information C1, the sound information V1 and the vibration information B1. The alarm device 260 may compute the vibration feature and the acoustic feature to generate the alarm information W1. In the present embodiment, the alarm device 260 may extract feature parameters from the vibration information B1, the speed information C1 and the sound information V1, identify and classify the parameters by means of an order tracking technology and a Bayesian classification theory. Additionally, the analysis host 250 may further generate a vibration feature and an acoustic feature of the vehicle 100 according to the temperature information T1.

In the present embodiment, information ranges of a plurality of normal vibration features and a plurality of normal acoustic features may be built in the analysis host 250. In this way, the analysis host 250 may compare the vibration feature and the acoustic feature generated by the vehicle 100 with the normal vibration features and the normal acoustic features respectively. When information ranges of the vibration feature or the acoustic feature generated by the vehicle 100 are out of the information ranges of the normal vibration features, a user or a driver of the vehicle 100 may quickly anticipate that abnormality or breakdown is about to occur or has occurred to the wheel assembly 130 or the brake system 150 of the vehicle 100. In the meantime, the analysis host 150 may send corresponding alarm information W1 to the alarm device 260, and the alarm device 260 output the alarm information W1 in a manner of an image or a sound, for example, to generate breakdown information to the driver or the user. For example, the analysis host 150 may determine whether abnormality occurs to the clutch 190 and the universal joints 161 to 163 of the vehicle 100 according to the vibration feature and the acoustic feature and generate the alarm information W1 to instruct the alarm device 260 to generate the breakdown information when the abnormality occurs to the clutch 190 and/or the universal joints 161 to 163.

The analysis host 250 may include a digital signal processor (DSP, which is not shown). In the present embodiment, the DSP of the analysis host 250 may filter background noise while the vehicle 100 is travelling or filter environment noise occurring due to vibration by using a digital filter according an adaptive algorithm. Therefore, the instant detection system 200 of the present embodiment can generate the alarm information W1 by means of the computation performed by the DSP according to the high-resolution computation result as well as by using the features of a system sate indicated by the vibration feature and the acoustic feature, which is different from the commonly known method of measuring on the noise spectrum.

For example, the temperature detector 210 may detect an operational temperature of an activated part of the brake system 150 and transmit the detected temperature information T1 of the brake system 150 to the analysis host 250. The analysis host 250 may combine the received temperature information T1 with the vibration information B1, the speed information C1 or the sound information V1 to generate the vibration feature and the acoustic feature. The analysis host 250 may compare the generated vibration feature and acoustic feature with the originally built normal vibration feature and acoustic feature. When a temperature of the overall brake system 150 rises due to the brake caliper 152, a brake lining pad, or hydraulic oil of the brake system 150 being overheated, or the brake disc 154 (brake drum) being deformed, when a temperature of the wheel 132 of the wheel assembly 130 rises as the temperature of the brake system 150 rises, or when the damper 184 of the suspension system 180 is failed, the vibration feature and/or the acoustic feature generated from the analysis of the analysis host 250 may be exceed the normal information range. Thus, the analysis host 250 may determine that the brake system 150 or the wheel assembly 130 of the vehicle 100 in the abnormal state according to the computation of the DSP. Additionally, the analysis host 250 may transmit the alarm information W1 to the alarm device 260 according to the vibration feature and the acoustic feature corresponding to the abnormal state. Then, the alarm device 260 may convert the received alarm information W1 into the breakdown information presented in a form of a sound, texts, or an image to inform the driver or the user about temperature abnormality occurring to the wheel assembly 130 and/or the brake system 150 of operation abnormality of the suspension system 180 in the vehicle 100.

In the present embodiment, the alarm device 260 may send alarm sounds of different types, emit alarm lights in different brightness levels or present the breakdown information by displaying word or images using a display panel. The invention is not intent to limit the form of the breakdown information sent by the alarm device 260. In the present embodiment, the alarm device 260 is, for example, any type of electronic display device, an alarm light and/or a buzzer, and the user may select the preferable method of presenting the breakdown information or alarm based on actual demands.

When the breakdown occurs to the vehicle 100, different types of abnormal noise with different frequencies, lengths or amplitudes may be generated in different positions along with the speed variation of the vehicle 100. Thus, in the present embodiment, the rotational speed detector 220 may perform detection in collocation with the acoustic detector 230. Thus, when the acoustic detector 230 detects the abnormal noise generated when the vehicle 100 is operated in different rotational speeds, the acoustic detector 230 may convert the detected abnormal noise into the sound information V1 and transmit it to the analysis host 250 for further analysis. The analysis host 250 may further determine which part of the wheel assembly 130 or the brake system 150 the breakdown occurs to according to the sound information V1 generated from different types of abnormal noise and transmit the related alarm information W1 to the alarm device 260, and then the alarm device 260 sends out the breakdown information.

In the present embodiment, the acceleration detector 240 may output an electronic signal proportional to a vibration acceleration speed to anticipate abnormal vibration occurring due to the deformation of the wheel assembly 130 or the abnormal state of the brake system 150 resulted from the brake disc 154 being deformed or the axle 136 being damaged, so as to output the vibration information B1. Besides, the acoustic detector 230 may perform detection in collocation with not only the rotational speed detector 220, but also the acceleration detector 240. For example, the acoustic detector 230 may detect the abnormal noise generated by the wheel assembly 130 and the brake system 150 being deformed or damaged to output the sound information V1. Thus, when the acoustic detector 230 performs the detection with the acceleration detector 240, the analysis host 250 may analyze and compute according to the vibration information B1 generated by the acceleration detector 240 and the sound information V1 generated by the acoustic detector 230 to generate the related vibration feature and acoustic feature and compare the vibration information B1 and the sound information V1 with the built vibration features and acoustic features, so as to anticipate breakdown situation that may occur. In other words, models of the vibration and acoustic features with respect to reasons and positions of the breakdown that may possibly occur to the vehicle 100 may built in the analysis host 250, such that the reason and the position of the breakdown occurs to the vehicle 100 may be quickly analyzed and determined. Moreover, even in case the rotational speed detector 220 is failed, the instant detection system 200 of the present embodiment may still detect and anticipate the overall state of the wheel assembly 130, the brake system 150 and the suspension system 180 in collocation with auxiliary vibration and acoustic algorithms to continue the detection and anticipation.

In addition, the analysis host 250 may recognize a position and a situation of the abnormality, such as the deformation of the brake disc 154, abnormal wear of the brake lining pad and an issue of overheated hydraulic oil, occurring to the brake system 150 solely according to the computed acoustic feature. Moreover, the analysis host 250 may also immediately analyze tire pressure states, thread depths and deformation of the wheels 132 through analyzing the acoustic feature. To be detailed, the analysis host 250 may determine a sound source of the abnormal noise of the vehicle 100 through analyzing the frequency and the amplitude of the abnormal noise generated by the vehicle 100 and according to a position with the maximum amplitude of the abnormal noise detected by a plurality of acoustic detector 230, so as to determine the breakdown position of the vehicle 100.

In the present embodiment, the analysis host 250 may transmit the alarm information W1 to a cloud server (not shown) through, for example, a wireless network and then transmits the alarm information W1 to the alarm device 260 deployed in a remote end through the cloud server. Thus, the alarm device 260 in the remote end may instantly send the breakdown information with respect to the vehicle 100, such that an apparatus or a person remotely monitoring the travelling state of the vehicle 100 may immediately obtain the breakdown information of the vehicle 100 and apply an corresponding emergency reaction according to the received breakdown information. Therefore, either the user of the vehicle 100 or the person remotely monitoring the vehicle 100 may acquire the operation state of the vehicle 100 as quickly as possible to improve the driving safety of the vehicle 100.

The vehicle 100 of the present embodiment may be a car as illustrated in FIG. 1A or, certainly, any other vehicle, such as a truck or a bus that requires the wheel assembly 130, the brake system 150 and the suspension system 180. The invention is not intent to limit the type of the vehicle 100.

To summarize, the instant detection system of the vehicle provided by the invention can be configured to instantly detect the states of the brake system, wheel assemblies and the suspension system. The instant detection system has the analysis host, and the analysis host can generate the corresponding alarm information according to the speed information, the sound information, the temperature information and the vibration information provided by the rotational speed detector, the acoustic detector, the temperature detector and the acceleration detector. Additionally, the alarm device is coupled to the analysis host and receive the alarm information therefrom to generate the breakdown information corresponding to the alarm information. Moreover, the breakdown information may be presented in the form of texts or the image on the display panel or may be sent in the form of a breakdown light or a breakdown alarm sound. Thus, the user or the driver can immediately obtain the operation states of the brake system and the wheel assemblies, such as the tire pressure states, thread depths of the wheels, whether the brake discs are deformed, or whether the hydraulic oil of the brake system is overheated, so as to provide early warning about the breakdown that may occur to prevent accident events.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An instant detection system of a vehicle, wherein the vehicle comprises a body, a plurality of wheel assemblies and a brake system, the wheel assemblies and the brake system are disposed on the body respectively, each of the wheel assemblies comprises a wheel, a rim and an axle, and the wheel assemblies are coupled with the brake system, the instant detection system comprising:

a plurality of temperature detectors, disposed on the brake system and configured to detect temperature information of the brake system;

a plurality of rotational speed detectors, disposed on the body and adjacent to the wheel assemblies to detect speed information of the wheel assemblies;

a plurality of acoustic detectors, disposed on the body and adjacent to the brake system to detect sound information of the wheel assemblies or sound information of the brake system;

an analysis host, disposed on the body and coupled with the temperature detectors, the rotational speed detectors and the acoustic detectors to receive the temperature information, the speed information and the sound information, and instantly analyze the temperature information, the speed information and the sound information to generate alarm information; and an alarm device, coupled with the analysis host and configured to receive the alarm information and display the breakdown information of the vehicle according to the alarm information.

2. The instant detection system according to claim 1, wherein the brake system further comprises a plurality of brake calipers and a plurality of brake discs, each of the brake calipers is coupled to the axle, and the brake calipers are movably clipped on the brake discs respectively.

3. The instant detection system according to claim 1, wherein the vehicle further comprises a suspension system disposed on the body and coupled with the axle, the suspension system comprises a spring, a damper and a plurality of linking rods, the spring sleeves the damper, and the linking rods are connected to the axle.

4. The instant detection system according to claim 3, further comprising at least one acceleration detector disposed on at least one of the linking rods and configured to detect vibration information of the brake system, the wheel assemblies and the suspension system.

5. The instant detection system according to claim 4, wherein the analysis host is coupled with the at least one acceleration detector to receive the vibration information and analyzes according to at least one of the vibration information, the temperature information, the speed information and the sound information to generate the alarm information.

6. The instant detection system according to claim 4, wherein the analysis host generates a vibration feature and an acoustic feature according to the speed information, the sound information and the vibration information, and the analysis host analyzes the vibration feature and the acoustic feature to generate the alarm information.

7. The instant detection system according to claim 6, wherein the vehicle further comprises:

a plurality of universal joints; and a clutch, coupled to the universal joints sequentially.

8. The instant detection system according to claim 7, wherein the analysis host determines whether abnormality occurs to the clutch and/or the universal joints according to the vibration feature and the acoustic feature and generates the alarm information to instruct the alarm device to generate the breakdown information when the abnormality occurs to the clutch and/or the universal joints.

9. The instant detection system according to claim 4, wherein a plurality of normal vibration features and a plurality of normal acoustic features are built in the analysis host, and the analysis host compares the vibration feature with the normal vibration features and compares the acoustic feature with the normal acoustic features, so as to determine operation states of the wheel assemblies and the brake system.

10. The instant detection system according to claim 4, wherein the analysis host comprises a digital signal processor (DSP) to compute the temperature information, the speed information, the vibration information and the sound information to generate the alarm information.

11. The instant detection system according to claim 1, further comprising:

a cloud server, configured to receive the alarm information from the analysis host and transmit the alarm information to the alarm device deployed in a remote end through a network.

12. The instant detection system according to claim 1, wherein the alarm device comprises a display panel configured to display the breakdown information of the vehicle.

13. The instant detection system according to claim 1, wherein the sound information comprises a frequency and amplitude of abnormal noise generated by the vehicle.

14. The instant detection system according to claim 1, wherein the breakdown information is generated in a manner of a breakdown light or a breakdown alarm sound.

15. The instant detection system according to claim 1, wherein the alarm device comprises an alarm light and/or a buzzer.

16. The instant detection system according to claim 1, wherein the brake system comprises a disc brake system and a drum brake system.

* * * * *